Figure 1:
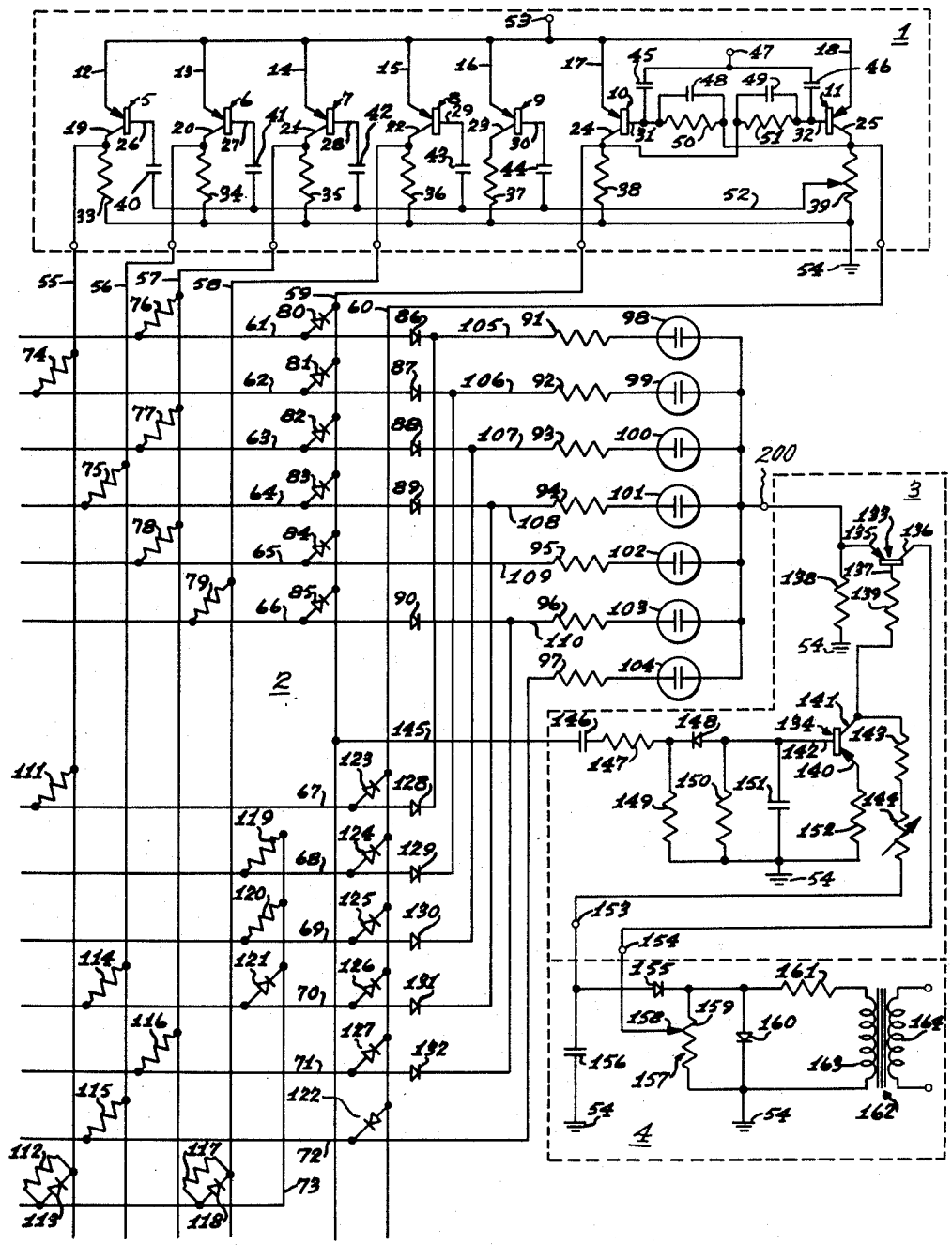

Nov. 28, 1961 R. A. HEMPEL 3,010,651
ELECTRONIC NUMERICAL DISPLAY
Filed Sept. 6, 1960 3 Sheets-Sheet 3

| TRANSISTOR COUNT | 5 | 6 | 7 | 8 | 9 | 10 | 11 |
|---|---|---|---|---|---|---|---|
| 0 |  | ON | ON | ON | ON | ON |  |
| 1 | ON |  | ON | ON | ON |  | ON |
| 2 | ON | ON |  | ON | ON | ON |  |
| 3 | ON | ON | ON |  | ON |  | ON |
| 4 | ON | ON | ON | ON |  | ON |  |
| 5 |  | ON | ON | ON | ON |  | ON |
| 6 | ON |  | ON | ON | ON | ON |  |
| 7 | ON | ON |  | ON | ON |  | ON |
| 8 | ON | ON | ON |  | ON | ON |  |
| 9 | ON |  |  |  |  |  | ON |

| NEON LAMP \ COUNT | 0 | 1 | 2 | 3 | 4 | 5 | 6 | 7 | 8 | 9 |
|---|---|---|---|---|---|---|---|---|---|---|
| 98 | ON |  | ON | ON |  | ON | ON | ON | ON | ON |
| 99 |  |  | ON | ON | ON | ON | ON |  | ON | ON |
| 100 | ON |  | ON | ON |  | ON | ON |  | ON | ON |
| 101 | ON |  |  |  | ON | ON | ON |  | ON | ON |
| 102 | ON |  | ON |  |  | ON |  | ON |  |  |
| 103 | ON | ON | ON | ON | ON |  |  | ON | ON | ON |
| 104 | ON | ON |  | ON | ON | ON | ON | ON | ON | ON |

INVENTOR.
ROY A. HEMPEL ns patent 3,010,651
Patented Nov. 28, 1961

3,010,651
ELECTRONIC NUMERICAL DISPLAY
Roy A. Hempel, Phoenix, Ariz., assignor to Robotomics Enterprises, Inc.
Filed Sept. 6, 1960, Ser. No. 54,078
14 Claims. (Cl. 235—92)

This invention relates to an electronic apparatus and more particularly to an electronic numerical display circuit and apparatus responsive to combinations of simultaneously applied electrical pulses to yield an indication of the combination and arrangement of pulses received.

In many industrial and other operations utilizing electronic computers, automatic test systems, frequency measuring systems and others, it is frequently necessary or advantageous to display electrical pulse information in the form of visual displays. That is, the number of electrical pulses appearing or produced at some point are advantageously designated on a visual indicator. These indicator circuits usually derive actuating potentials from certain modes or junctions of elements of a counter circuit for energizing or de-energizing the visual indicating elements, which frequently are neon filled lamps but may be other means. The circuitry for coordinating and automatically selecting the different potentials from the circuit is herein referred to as the "matrix" and its function of so coordinating these potentials and applying them to the visual indicator circuit is termed "matrixing."

The numerical display and matrix circuits disclosed in my copending application, Serial No. 857,886, now abandoned, filed December 7, 1959, in cooperation with an appropriate electronic counter, provide admirable results for the purposes and assignments to which they are applied. However, in some industrial or other operations, improved display matrixing circuits are required which provide even greater reliability of operation, longer field life without adjustment and elimination of display information during periods of too rapid pulse information change.

It is, therefore, a principal object of my invention to provide a novel means of matrixing between electronic counter and display to achieve a more reliable and long-lived numerical display.

It is still another object of my invention to provide a means of extinguishing the display when the electrical pulse information supplied to the matrixing circuit changes faster than some predetermined rate.

It is still another object of my invention to provide a novel and relatively inexpensive numerical display circuit.

In counter circuits in which my invention is particularly applicable, provision is made with relatively simple and inexpensive circuit components for visually displaying the count number of the circuit. Seven slits are formed in an opaque surface and disposed in the form of a parallelogram with one slit generally bisecting the parallelogram. Each slit exposes a different neon lamp and predetermined combinations of the neon lamps are selectively lit or extinguished by combinations of binary and quinary circuit transistor collector potentials from a suitable electronic counter to form arabic numerals, zero through nine, as viewed through the slits, corresponding to the number of count of the circuit.

In accordance with an important aspect of my invention, provision is made to gate the neon display lamps by means of a frequency sensitive circuit that permits the display to be On and to display arabic numerals when the electronic counter is operating at very low rates of count, and to be Off or extinguished and have no display whatsoever when the electronic counter is operating at medium and high counting rates. This feature displays numerical information only when it is meaningful to the human operator, that is, at low counting rates.

In accordance with another important aspect of my invention increased reliability and longer life of the display circuit is achieved by providing higher indicator circuit potentials for actuating neon lamps. Since the potential required to fire neon filled indicator lamps changes with the age of the lamp, such potentials which are higher than the minimum potentials required to fire the lamp when it is new prolong the useful life of the lamp and accordingly, the display circuit itself. That is, if the lamp should require a larger firing potential with age, the circuit is preconditioned to provide such a potential.

Figure 2:
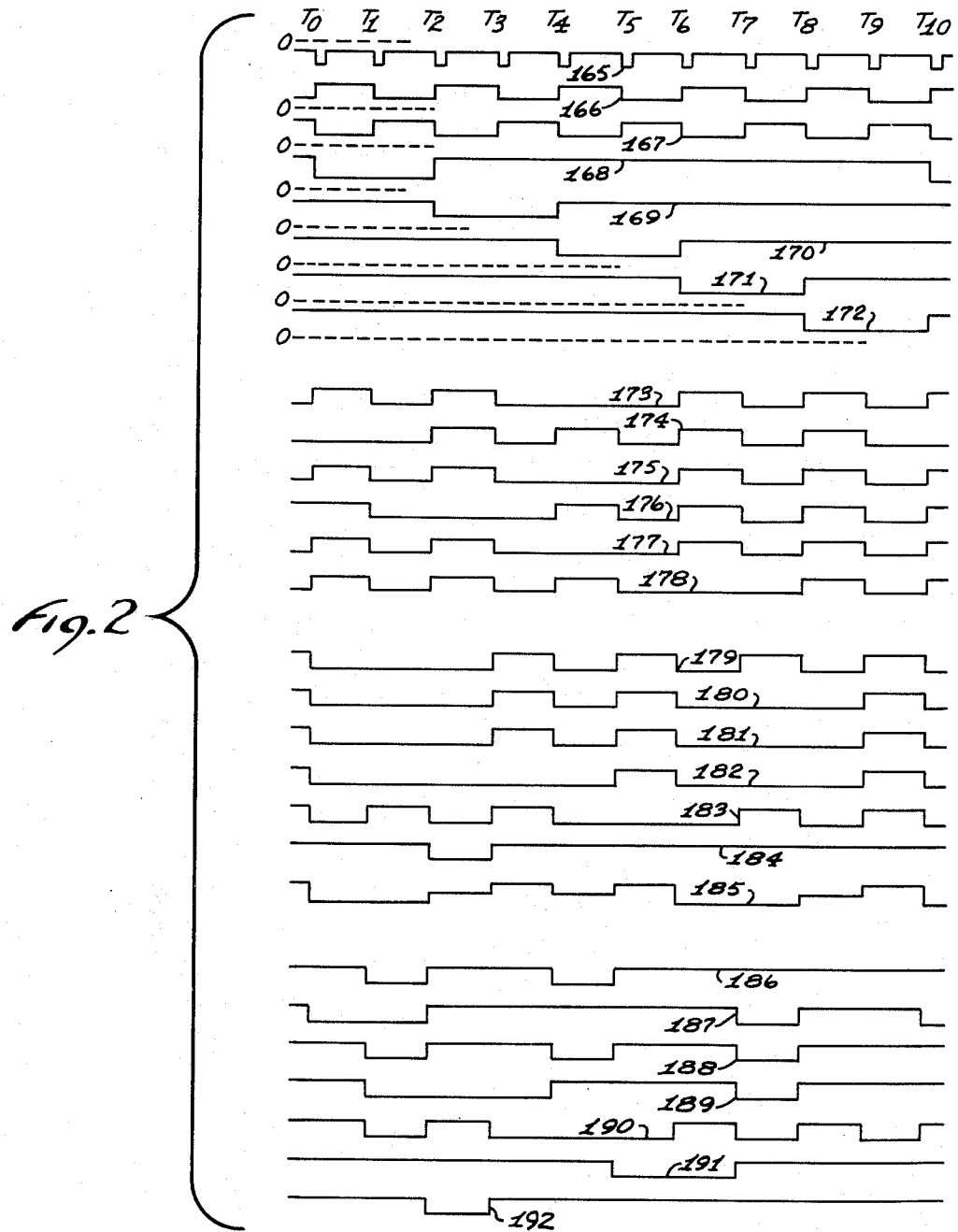
Figures 3, 4, 5, 6:
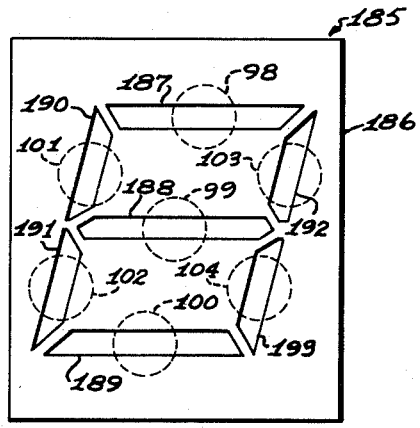

Other and further objects and advantages will appear from a more detailed description of the invention considered in conjunction with the accompanying drawings in which:

FIGURE 1 illustrates schematically the overall counter matrixing and indicator circuit of my invention, FIGURE 2 illustrates graphically the potentials at the collectors of the binary and quinary loop transistors in FIGURE 1, at different times at which pulses are applied to the input of the circuit and corresponding matrix potentials effective in firing and extinguishing neon lamps in the indicator circuit, FIGURE 3 represents the neon lamp display array and cover therefor forming a part of the display circuit according to one feature of my invention, FIGURE 4 illustrates a table of values of potentials of the binary and quinary collectors of FIGURE 1 for various stages of operation thereof, FIGURE 5 illustrates the arabic numerals 0 through 9 as formed by the display circuit of FIGURE 1, and FIGURE 6 is a table indicating which combination of lamps the neon array are lit to display numbers 0 through 9 as shown in FIGURE 5.

Referring now more particularly to FIGURE 1 of the drawings for a detailed description of my invention, 1 represents generally the output section of a typical counter circuit with which the present invention is cooperative, showing binary and quinary sections as described more fully in my aforementioned copending application Serial No. 857,886, now abandoned, and is enclosed in a dotted rectangle in FIGURE 1 to facilitate identification and ready reference. The binary section of this counter circuit employs transistors 10 and 11 and has two states of stable equilibrium, in each of which state, one transistor is conducting heavily and the other is substantially non-conducting or cut-off. The binary circuit transistors 10 and 11 have respective emitters 17 and 18 of P-type semiconducting material, respective bases 31 and 32 of N-type semiconducting material and respective collectors 24 and 25 of P-type semiconducting material. The base 31 of transistor 10 is coupled through a resistor 50 and capacitor 48 in parallel with each other, to collector 25 of transistor 11, and the base 32 of transistor 11 is coupled through a resistor 51 and a capacitor 49 in parallel with each other, to collector 24 of transistor 10. Base 31 is connected to capacitor 45, the other side of which is connected to terminal 47, and base 32 is connected to capacitor 46, the other side of which goes to ground terminal 54. Emitters 17 and 18 have a positive potential applied thereto from terminal 53. Collector 24 of transistor 10 is connected to line 59 and collector 25 of transistor 11 is connected to line 60.

The action of the binary transistors 10 and 11 is well known in that a first pulse applied to the bases 31 and 32 through capacitors 45 and 46 from terminal 47 serves to cause one of the transistors, for example transistor 10, to conduct which raises its collector 24 to a high potential, and transistor 11 to be cut-off which lowers its collector 25 to a low potential; a second pulse applied to the bases 31 and 32 now causes transistor 10 to be cut-off which lowers its collector 24 potential, and transistor 11 to conduct which raises its collector 25 to a high potential; a third pulse reverses the condition to that described for the first pulse, and each additional pulse serves to reverse the state of the transistor 10 and transistor 11. This binary action is shown in FIGURE 2 wherein 165 represents the input pulses to bases 31 and 32, 166 shows the potential changes on collector 24 of transistor 10, and 167 shows the potential changes on collector 25 of transistor 11. Ground potentials are shown as represented by the 0 volt dotted lines, in which the input 165 consists of negative going pulses and the potentials shown by 166 and 167 alternate between low potential near ground potential and higher positive potential represented by those portions of the wave shapes furthest from the ground potential line. To further illustrate the manner in which the binary operates, and referring to both transistor 10 and 11 of FIGURE 1 and waveshapes 165, 166 and 167 of FIGURE 2, $T_0$ a negative pulse on 165 occurs which causes transistor 10 to conduct thus raising its collector potential as shown at 166 under $T_0$, and causes transistor 11 to be cut-off thus lowering its potential as shown on waveshape 167 under $T_0$. Examination of waveshapes 165, 166 and 167 shows that with each successive pulse of 165 the potential conditions shown in 166 and 167 alternate, illustrating the manner in which collector 24 and 25 voltages are applied to lines 59 and 60 respectively, of diode matrix 2.

The quinary circuit of FIGURE 1 comprises five transistors 5, 6, 7, 8 and 9, having respective emitters 12, 13, 14, 15 and 16 of P-type semiconducting material, respective bases 26, 27, 28, 29 and 30 of N-type semiconducting material and respective collectors 19, 20, 21, 22 and 23 of P-type semiconducting material. Load resistors 33, 34, 35, 36 and 37 are connected between ground and respective collectors 19, 20, 21, 22 and 23. Thus, the quinary circuit is similar to that disclosed in my aforementioned copending application Serial No. 857,886, and has the respective electrodes including emitters, bases and collectors, biased and intercoupled so as to form a multistable closed loop circuit having 5 states of stable equilibrium, in each of which, one of the transistors is cut-off or non-conducting and the others are conducting. To this end, each of the emitters 12, 13, 14, 15 and 16 have a positive potential applied thereto from terminal 53. Thus, the quinary circuit emitters are at the same potential as the binary circuit emitters and are effectively, conductively joined. The collector of each quinary circuit transistor 5, 6, 7, 8 and 9 is coupled to the base of each other quinary circuit transistor for establishing transistor bias operating levels and transfer of pulses developed from collectors to bases.

The output pulses developed in binary transistor 11 are transferred to the quinary by means of line 52 connected between the arm of resistor 39 and quinary capacitors 40, 41, 42, 43 and 44. All of the quinary circuit is not shown as this is covered in detail in my copending application heretofore referred to, but a sufficient amount of circuitry in 1 of FIGURE 1 is shown to establish general operation and explain more fully the operation of matrix 2 of FIGURE 1. Quinary collectors 19, 20, 21 and 22, are connected respectively to matrix 2 lines 55, 56, 57 and 58.

FIGURE 2 waveshapes 168, 169, 170, 171 and 172 show the quinary action of respective collectors 19, 20, 21, 22 and 23. As the binary pulses from line 52 enter the quinary, the non-conducting transistor proceeds in the direction as shown in waveshapes 168 through 172. More specifically, if transistor 5 is initially non-conducting, the first negative going pulse from line 52 will cause transistor 6 to be non-conducting, the second negative going pulse will cause transistor 7 to be non-conducting, the third negative going pulse will cause transistor 8 to be non-conducting, the fourth negative going pulse will cause transistor 9 to be non-conducting, and the fifth negative going pulse will cause transistor 5 to be non-conducting, the cycle then repeating itself for additional negative going pulse. Four of the quinary transistors will always be conducting. The entire decade counter 1 of FIGURE 1 takes 10 pulses into terminal 47 as illustrated in FIGURE 2 waveshapes 165 through 172 to complete a counter cycle. The objective of FIGURE 1 item 2 matrix is to translate the electrical count condition of counter 1 to an arabic numerical display number, one number at a time, of the form shown in FIGURE 5. A preliminary explanation of what to expect from counter 1 in the way of electrical potentials and sequencing has been given in order to facilitate a more complete understanding of matrix 2 of FIGURE 1.

In accordance with a main feature of my invention, provision is made to display arabic numerals using an improved resistor diode matrix 2 of FIGURE 1. Positive potentials are applied to one side hereafter referred to as the first terminals of neon lamps 98, 99, 100, 101, 102, 103 and 104 from counter circuit 1 through matrix network 2, a negative direct potential varying in amplitude at the rate of 60 times a second or some other suitable frequency, is applied to the second terminals of the neons through terminal 200. To describe more fully the circuit arrangements and interconnections, neon lamp 98 first terminal is connected to resistor 91 which is connected to the negative element of diode 86 and the negative element of diode 128. The positive element of diode 86 connects to quinary collector 21 of transistor 7 through line 61 and resistor 76. The positive element of diode 86 also connects to the positive side of diode 80, the negative terminal of 80 in turn connects to collector 24 of binary transistor 10. The positive element of diode 128 connects to resistor 111 which connects to quinary transistor 5 collector 19, and diode 123 positive side connects to diode 128 positive side, with the negative end of diode 123 tied to binary transistors 11 collector 25.

Neon lamp 99 connects to resistor 92 the other terminal of which connects to the negative terminals of diode 87 and 129. Diode 87 positive element connects to resistor 74 the other side of which goes to collector 19 of transistor 5, and diode 87 also connects to the positive side of diode 81 the other terminal of which connects to collector 24 of transistor 10. The positive side of diode 129 connects to the positive side of diode 124 the other side of which connects to collector 25 of transistor 11, and the positive side of diode 129 also connects to resistor 119 the other side of which connects to resistor 120, negative side of diode 121, positive side of diode 118, to resistor 117, to the positive side of diode 113, and to resistor 112, all of these herein mentioned connections being made on line 73. Resistor 112 is connected in parallel with diode 113, and the junction at the negative side of diode 113 is connected to collector 19 of transistor 5. Resistor 117 is connected in parallel with diode 118 and the negative terminal of diode 118 goes to collector 22 of transistor 8. Resistor 120 is connected between line 73 and 69 and diode 121 is connected between line 73 and 70.

Neon lamp 100 connects to resistor 93 the other side of which connects to the negative terminals of diodes 88 and 130. The positive side of diode 88 connects to resistor 77 the other side of which connects to collector 21 of transistor 7. The positive side of diode 88 also connects to the positive side of diode 82 the negative side of which connects to binary transistor 10 collector 24. The positive side of diode 130 connects to resistor 120 and also to the positive terminal of diode 125 the negative terminal of which connects to binary transistor 11 collector 25.

Neon lamp 101 connects to resistor 94 the other side of which connects to the negative elements of diodes 89 and 131. The positive element of diode 89 connects to resistor 75 and the positive side of diode 83. The other side of resistor 75 connects to collector 20 of quinary transistor 6. The negative element of diode 83 connects to the collector 24 of transistor 10. The positive side of diode 131 connects to resistor 114, and the positive side of diodes 121 and 126. Resistor 114 connects between diode 131 and collector 20 of transistor 6. The negative terminal of diode 126 connects to collector 25 of transistor 11. The negative terminal of diode 121 connects to line 73 noted above.

Neon lamp 102 first terminal connects to resistor 95 which in turn connects to resistor 78 and positive side of diode 84. The other side of resistor 78 connects to collector 21 of transistor 7. The negative side of diode 84 connects to collector 24 of transistor 10.

Neon lamp 103 connects to resistor 96, which in turn, connects to the negative element of diode 90 and diode 132. The positive element of diode 90 connects to resistor 79 and the positive side of diode 85. Resistor 79 connects between diode 90 and collector 22 of transistor 8. The negative element of diode 85 connects to collector 24 of transistor 10. The positive side of diode 132 connects to resistor 116 which in turn connects to collector 21 of transistor 7. Diode 127 positive side connects to diode 132 and diode 127 negative side connects to collector 25 of transistor 11.

Neon 104 first terminal connects to resistor 97 the other side of which connects to resistor 115 and negative side of diode 122. The other side of resistor 115 connects to collector 20 of transistor 6. The positive side of diode 122 connects to collector 25 of transistor 11.

The second terminals of neons 98, 99, 100, 101, 102, 103 and 104 all connect to terminal 200. Transistor 133 is a P-N-P type with emitter 135 of P-type semiconducting material, base 137 of N-type semiconducting material, and collector 136 of P-type semiconducting material. The emitter 135 of transistor 133 connects to terminal 200, and to resistor 138 the other side of which connects to ground 54. The collector 136 of transistor 133 connects to terminal 154 which connects to pulsating direct potential source 4. The primary 164 of transformer 162 connects to standard 115 volt 60 cycle alternating current supply. The secondary 163 of transformer 162 connects between ground 54 and resistor 161 the other side of which connects to zener diode 160, isolating diode 155, the resistive element 159 of potentiometer 157. The negative side of zener diode 160 connects to ground 54 and one end of element 159 of potentiometer 157 connects to ground 54. The adjustable center arm 158 of potentiometer 157 connects to terminal 154. The positive side of diode 155 connects to capacitor 156 the other side of which connects to ground 54. Diode 155 positive side also connects to terminal 153.

Terminal 153 connects to resistors 144 and 143 in series with each other. Resistor 143 connects to collector 141 of transistor 134. Transistor 134 is P-N-P type with emitter 140 of P-type semiconducting material, base 142 of N-type semiconducting material, and collector 141 of P-type semiconducting material. Resistor 152 connects between ground 54 and emitter 140 of transistor 134. Capacitor 151 connects between base 142 and ground 54, resistor 150 connects between base 142 and ground 54, positive side of diode 148 connects between base 142 and resistors 147 and 149, with the other side of resistor 149 returning to ground 54 and the other side of resistor 147 connecting to capacitor 146. Capacitor 146 connects between resistor 147 and line 145, with line 145 connecting to collector 24 of transistor 10. Resistor 139 connects between base 137 of transistor 133 and collector 141 of transistor 134.

Typical values for components shown in figure matrix 2, neon illumination control 3, and pulsating supply unit 4 are as follows:

Diodes (except 160)___ Type 1N90.
Transistor 133_____ 2N398.
Transistor 134_____ 2N192.
Zener diode 160_____ 75 volt 10 watt.
Neon lamps_____ Type NE-2H or NE-2M aged and selected for similar firing potential.
Transformer 162_____ 1:1 turns ratio.
Capacitor 156_____ 60 to 100 μfd.
Capacitor 151_____ 10 μfd.
Potentiometer 159____ 5K.
Resistor 161_____ 1.8K.
Resistors:
   74, 75, 76, 77, 111,
    116, 117, 119,
    120_____ 47K.
   114_____ 33K.
   112, 117, 138_____ 27K.
   78, 95, 97, 147___ 22K.
   143_____ 15K.
   91, 92, 93, 94, 96___ 10K.
   150_____ 56K.
   149_____ 100K.
   152_____ 470 ohms.
   139_____ 1K.
Potentiometer 144____ 10K.

While the many components of my invention heretofore described may be of different parameters determinable by one skilled in the art, the preceding list sets forth typical parameters according to an embodiment of my invention operated with admirable results.

The operation of my invention is as follows: for any count between 0 and 9 as shown in FIGURE 4 the quinary transistors 5 through 9 and the binary transistors 10 and 11 will be in a particular conduction or nonconduction state, with On in FIGURE 4 representing conduction of the particular transistor listed, and a blank space representing non-conduction of the particular transistor listed. To display a complete number for a particular count, FIGURE 5 shows the segment arrangement of the numbers, FIGURE 3 shows more specifically the spatial arrangement of the 7 segments, and FIGURE 6 shows which particular segments of FIGURE 3 will be illuminated with neon lamp On for a particular count.

The neon lamps fire or turn on at some unique potential across the lamp terminals, which, for purposes of description, may be said to be 80 volts, and extinguish or turn off at some unique potential, which, for purposes of description, may be said to be 55 volts. The potential developed across neon lamps 98 through 104 is supplied positive on the first terminals through resistors 91 through 97 and pulsating negative potential on the neon lamp second terminals through terminal 200.

The potentials on FIGURE 1 lines 61 through 66 are shown from $T_0$ through $T_9$ by waveshapes 173 through 178, respectively, in FIGURE 2. The potentials on FIGURE 1 lines 67 through 73 are shown in FIGURE 2 by respective waveshapes 179 through 185. The potentials on FIGURE 1 lines 105 through 110 and line 72 are shown in FIGURE 2 by respective waveshapes 186 through 192.

A description in detail of several counter unique count positions is herein given to facilitate understanding of the operation of matrix 2 of FIGURE 1. For count 0 of decade counter 1, per FIGURE 4 and waveshapes of FIGURE 2, transistors 5 and 11 are Off or nonconducting, transistors 6, 7, 8, 9 and 10 are On or conducting. Transistor 7 supplies a high positive potential from its collector 21 through resistor 76, through diode 86 and resistor 91 to first terminal of neon lamp 98. This positive voltage in combination with the negative pulsating potential on the second terminal of neon 98 from terminal 200 is sufficient to alternately fire and extinguish neon 98 at the same repetition rate as the frequency of the pulsating direct potential from terminal 200. To the unaided observer's eye this appears as a steady light, on continuously. The positive potential supplied to neon 98 first terminal is sufficiently positive to insure that when the potential on the second terminal of lamp 98 is most negative, that 80 volts is exceeded across the neon lamp and that it fires. On the other hand, the voltage on the second terminal of neon 98 from terminal 200 changes sufficiently so that when this voltage swings positive, regardless of what is on the first terminal of the neon lamp, the lamp will extinguish, that is, the potential across the lamp terminals drops to less than its arbitrary extinguishing voltage of 55 volts. Neon lamps 98 through 104 all work in the same manner. This will be seen more fully as this description of FIGURE 1 operation is completed.

The positive potential in line 61 of FIGURE 1 was not lost to transistor 10 collector 24 to ground through diode 80 because transistor 10 is On with a high positive potential on the negative side of diode 80. Transistor 5 was Off and therefore, could supply no positive potential other than a small potential through resistor 111 to line 67. Therefore, neon 98 is effectively turned On by the positive potential supplied by line 61. This potential is not lost through diode 128 because a positive potential cannot get through the negative terminal of diode 128 due to high internal diode resistance when the current tries to flow backwards in the diode.

Neon 99 does not turn On or glow because neither line 62 nor line 68 supplies sufficient positive potential to the first terminal of neon 99. Transistor 5 is Off with low collector 19 potential and therefore can supply little voltage to line 62 through resistor 74. Transistor 8 is On and does supply a high positive potential through resistor 117 to line 73 thence through diode 113 line 55 and this is lost through resistor 33 to ground. Transistor 5 is Off or non-conducting and its collector potential is close to ground level.

Neon 160 is On and glowing because sufficient positive potential is supplied from transistor 7 collector 21 through resistor 77 to line 63 and thence through diode 88 and resistor 93 to neon 100. Potential supplied from transistor 8 collector 22 through resistor 117 to line 73 and through resistor 120 to line 69 is lost to ground through diode 125 and resistor 39. However, the positive potential on line 107 supplied by transistor 7 collector 21 through resistor 77 is not lost to line 69 because it cannot get through diode 125 in the back direction.

It follows that a careful examination of the FIGURE 1 circuitry along with an examination of the waveshapes of FIGURE 2 will show that the rest of neon lamps 101 through 104 will be On and glowing. Other numbers for various decade counter counts from 1 through 9 will also be displayed and their manner of display readily apparent by a study of the circuitry, tables, and waveshapes included herein.

In accordance with a feature of my invention, provision is made for rendering the display circuit lamps unresponsive to incoming pulse frequencies greater than a value which is meaningful to an observer. To this end, the potential at terminal 200 and, therefore, at the second terminals of lamps 98 through 104, is controlled so as to vary in negative value, generally inversely as the input frequency, by a circuit generally designated 3.

The circuit 3 of FIGURE 1 includes a transistor 134 of the P-N-P type having an emitter 140, a collector 141 and a base 142. The pulses appearing at collector 24 of binary transistor 10 are applied across resistor 38 having one end grounded, through line 59, a line 145, a capacitor 146, a resistor 147 and a resistor 149, the other end of which is grounded. The pulses produced across resistor 141 are applied to the base 142 of transistor 134 through a detector type of input circuit including a diode 148 having its cathode connected to the ungrounded end of resistor 149, its anode connected to base 142 and a parallel connected resistor-capacitor combination 150–151 connected between base 142 and ground. Thus, the negative pulses passed by diode 148 are smoothed by the resistor-capacitor combination 150–151 to provide a direct negative potential signal bias to the base 142. The emitter 140 of transistor 134 is connected to ground through a resistor 152 and the collector 141 of this transistor is connected to negative potential terminal 153 through a resistor 143 and a series connected variable resistor 144. The bias provided on base 142 as described above, is negative and in accordance with transistor principles, an increased negative bias applied to the base of a P-N-P type of transistor, increases the current conduction therein. In response to such increased current conduction, the potential at collector 141 becomes less negative and this potential is applied to the base of 137 of transistor 133 which is also of the P-N-P type. The effect of such potential change on base 137 is to render transistor 133 less conductive and thus, to decrease the magnitude of negative potential at 175 emitter and therefore, the potential applied to terminal 200 through this transistor from terminal 154. The effect of decreased potential at terminal 200, as explained hereinabove, is to decrease the potential difference across lamps 98–104.

With progressively increasing input pulse frequency, the potential so applied to terminal 200 gradually diminishes until the potential difference across any lamp of the group 98 through 104, as produced by the matrixing circuit 2, is insufficient to fire the lamps. Thus, it is seen that the circuit 3 is effective to turn off the indicator circuit in response to higher input pulse frequencies. By properly controlling the values of elements of circuit 3, in particular, capacitors 146 and 151 and resistors 149, 150, 147, 143, 144, 152 and 139, the frequency at which the neon lamps extinguish can be controlled accurately.

It is to be noted that although the circuit shown in FIGURE 1 of the drawings is set forth as having neon lamps 98 through 104 as visual indicating elements and that a negative pulsating potential produced by the circuit enclosed in outline designated 3 is applied to one side of each of these lamps, it is also entirely within the purview and scope of my invention to utilize other types on the second terminals thereof. As an example, the lamps 98–104 may be of the tungsten filament type and terminal 200, with filament type or neon lamps, may be either at ground potential or have a steady direct potential applied thereto.

While this invention has been described with respect to a particular embodiment thereof, it will be apparent to those skilled in the art that numerous modifications and alterations may be made therein without departing from the spirit or scope of the invention. It is intended by the following claims to cover these modifications and alterations.

What I claim as new and desire to secure by Letters Patent of the United States is:

1. An apparatus comprising a binary circuit including a pair of transistors each having a base and a collector, the bases and collectors of said binary circuit being intercoupled to form a bi-stable circuit having a pair of states of stable equilibrium in each of which one of the transistors is in a unique condition of conduction, a quinary circuit including five transistors each having a base and a collector, the bases and collectors of the quinary being intercoupled to form a multi-stable circuit having five states of stable equilibrium in each of which one of the quinary circuit transistors is in a unique condition of conduction, the collector of each of the transistors in the binary and quinary circuits being at one potential of a predetermined polarity in the unique condition of conduction and another potential of said predetermined polarity in the non-unique condition of conduction, means coupling the collector of a transistor in said binary circuit to the bases of said quinary circuit transistors, an indicator circuit including a plurality of lamps each having a first terminal coupled to a source of pulsating, direct potential of a polarity opposite to said predetermined polarity, means selectively applying a direct potential to second terminals of said lamps and including means for applying the potential of collectors of transistors in the non-unique condition of conduction to some of said first terminals, and for applying a potential intermediate to the potentials at collectors of transistors in unique and non-unique condition to the other of said first terminals and means responsive to the rate of change of potential from said one potential to said other potential at one of said collectors for decreasing the absolute value of pulsating direct potential applied at said second lamp terminals with increasing rate whereby the potential difference applied across said lamp in decreased with increased rate of potential change at said collectors.

2. An apparatus comprising a pair of terminals and means alternately establishing first and second potentials at a first of said pair of terminals and simultaneously establishing second and first potentials, respectively, at the second terminal of said pair, said potentials being of the same predetermined polarity, a plurality of terminals and means for changing the potential at said plurality of terminals in a predetermined order from said first potential to said second potential in response to the change in potential at one of said pair of terminals from said first potential to said second potential, an indicator circuit including a plurality of lamps each having a first electrode and a second electrode, means for applying the first potential from one of said terminals to the first electrode of a different predetermined group of said lamps, and a potential intermediate to said first and second potentials to the first electrode of other of said lamps for each combination of potentials at said terminals, means for applying a potential of polarity opposite to said predetermined polarity to the second electrodes of all of said lamps and including means responsive to the rate of change of potential at one of said terminals for varying the magnitude of potential applied to said second electrodes.

3. An apparatus comprising a pair of terminals and means alternately establishing first and second potentials at a first of said pair of terminals and simultaneously establishing second and first potentials, respectively, at the second terminal of said pair, said potentials being of the same predetermined polarity, a plurality of terminals and means for changing the potential at said plurality of terminals in a predetermined order from said first potential to said second potential in response to the change in potential at one of said pair of terminals from said first potential to said second potential, an indicator circuit including a plurality of lamps each having a first electrode and a second electrode, means for applying the first potential from one of said terminals to the first electrode of a different predetermined group of said lamps, and a potential intermediate to said first and second potentials to the first electrode of other of said lamps for each combination of potentials at said terminals, means for applying a potential of polarity opposite to said predetermined polarity to the second electrodes of all of said lamps and including means for rectifying the potential appearing at one of said terminals, and means for varying the magnitude of potential applied to said second electrodes in accordance with the value of said rectified potential.

4. An apparatus comprising a pair of terminals and means alternately establishing first and second potentials at a first of said pair of terminals and simultaneously establishing second and first potentials, respectively, at the second terminal of said pair, said potentials being of the same predetermined polarity, a plurality of terminals and means for changing the potential at said plurality of terminals in a predetermined order from said first potential to said second potential in response to the change in potential at one of said pair of terminals from said first potential to said second potential, an indicator circuit including a plurality of lamps each having a first electrode and a second electrode, means for applying the first potential from one of said terminals to the first electrode of a different predetermined group of said lamps, and a potential intermediate to said first and second potentials to the first electrode of other of said lamps for each combination of potentials at said terminals, means for applying a potential of polarity opposite to said predetermined polarity to the second electrodes of all of said lamps and including means for rectifying the potential appearing at one of said terminals, means for amplifying said rectified potential and means for applying said amplified potential to said second electrodes of said lamps.

5. An apparatus comprising a pair of terminals and means alternately establishing first and second potentials at a first of said pair of terminals and simultaneously establishing second and first potentials, respectively, at the second terminal of said pair, said potentials being of the same predetermined polarity, a plurality of terminals and means for changing the potential at said plurality of terminals in a predetermined order from said first potential to said second potential in response to the change in potential at one of said pair of terminals from said first potential to said second potential, an indicator circuit including a plurality of lamps each having a first electrode and a second electrode, means for applying the first potential from one of said terminals to the first electrode of a different predetermined group of said lamps, and a potential intermediate to said first and second potentials to the first electrode of other of said lamps for each combination of potentials at said terminals, means for applying a potential of polarity opposite to said predetermined polarity to the second electrodes of all of said lamps and including means for rectifying the potential appearing at one of said terminals and means including a pair of cascaded transistors for amplifying said rectified potential and applying the amplified potential to the second electrodes of said lamps.

6. An apparatus comprising a pair of terminals and means alternately establishing first and second potentials at a first of said pair of terminals and simultaneously establishing second and first potentials, respectively, at the second terminal of said pair of terminals, said potentials being of the same predetermined polarity, a plurality of terminals and means for changing the potentials at said plurality of terminals in a predetermined order from said first potential to said second potential in response to the change in potential at one of said pair of terminals from said first potential to said second potential, an indicator circuit including a plurality of lamps each having a first electrode and a second electrode, means for applying the first potential from one of said terminals to the first electrode of a different predetermined group of said lamps, and a potential intermediate to said first and second potentials to the first electrode of other of said lamps for each combination of potentials at said terminals, means for applying a potential of polarity opposite to said predetermined polarity to the second electrodes of all of said lamps and including means responsive to an increase in the rate of change of potential at one of said terminals for decreasing the potential applied to said second electrodes and responsive to a decrease in rate of change of potential at said one of said terminals for increasing the potential applied to said second electrodes.

7. An apparatus comprising a circuit having a pair of pluralities of nodes, means sequentially establishing a first potential of a predetermined polarity at one node of each plurality and a second potential of said predetermined polarity at each of the other nodes of each plurality in a predetermined order, a matrixing circuit including a plurality of indicator lamps each having a first and a second terminal, the first terminal of each lamp being coupled to one of the nodes of each plurality, means responsive to the change of potential at one of said nodes from said first potential to said second potential for applying a potential of polarity opposite to said predetermined plurality to the second terminals of said lamps, said last mentioned means being responsive to an increase in said rate to decrease said potential of opposite polarity and a decrease in said rate to increase said potential of opposite polarity.

8. An apparatus comprising a circuit having a pair of pluralities of nodes, means sequentially establishing a first potential of a predetermined polarity at one node of each plurality and a second potential of said predetermined polarity at each of the other nodes of each plurality in a predetermined order, a matrixing circuit including a plurality of indicator lamps each having a first and a second terminal, the first terminal of each lamp being coupled to one of the nodes of each plurality, means responsive to the change of potential at one of said nodes from said first potential to said second potential for applying a potential of polarity opposite to said predetermined polarity to the second terminals of said lamps, said last mentioned means including a circuit having a unidirectional device with one terminal connected to said node, a first transistor having a base and a collector, the other terminal of said unidirectional device being connected to said base, said unidirectional device being poled to pass potential pulses produced by the change in potential of said one of said nodes from said first to said second potential, a second transistor having a base and a collector and means coupling the collector of said first transistor to the base of said second transistor whereby the magnitude of potential at the base of said first transistor is dependent on the rate of change of potential at said one node from said first to said second potential to vary the magnitude potential on the base of said further transistor and the second terminals of said lamps in accordance with said repetition rate.

9. An apparatus according to claim 8 wherein said first potential is more positive than said second potential and said first and second transistors are of the P-N-P type.

10. An apparatus comprising a circuit having a first and second plurality of nodes, means sequentially establishing a first potential of a predetermined polarity at one node of each plurality and a second potential of said predetermined polarity at each of the other nodes of each plurality in a predetermined order, a matrixing circuit and an indicator circuit including a plurality of lamps each having a first and a second terminal, a pair of series connected resistors interconnecting a first group of said first lamp terminals to a node of said first plurality, the first terminal of each of the other lamps being connected to a node of one of said first plurality of said nodes through respective pairs of resistors having a series connected unidirectional device therebetween, a node of the second plurality being connected through a unidirectional device to the end of each resistor remote from that connected directly to said first plurality of nodes, nodes of said second plurality being connected through respective unidirectional devices to the ends of different resistors remote from the ends connected directly to the first terminals of said other lamps, resistors interposed in some of said last mentioned connections, a unidirectional device interposed in another of said connections and parallel connected resistor and unidirectional devices interposed in other of said last mentioned connections, the first terminals of said other lamps being connected to another node of said second plurality of nodes and means applying a potential of magnitude different from that at said first lamp terminals to said second lamp terminals.

11. An apparatus comprising a pair of terminals and means alternately establishing first and second potentials at a first of said pair of terminals and simultaneously establishing second and first potentials, respectively, at the second terminal of said pair of terminals, a plurality of terminals and means for sequentially changing the potential at one of said plurality of terminals from said first potential to said second potential and simultaneously establishing said second potential at the other terminals of said plurality, an indicator circuit including a plurality of lamps, means for applying said first potential from one of said terminals to the first electrode of a different predetermined group of said lamps and a potential intermediate to said first and second potentials to the first electrode of other of said lamps for each combination of potentials at said terminals, means for establishing a potential at the second terminals of said lamps different from that applied to any of the first terminals thereof.

12. A matrix circuit for operation with binary and quinary circuits including a pair of binary terminals and means alternately establishing first and second potentials at a first of said pair of binary terminals and simultaneously establishing second and first potentials, respectively, at the second terminal of said pair of binary terminals and simultaneously establishing second and first potentials, respectively, at the second terminal of said pair of binary terminals, a plurality of terminals and means for sequentially changing the potential at each of said plurality of terminals from said first potential to said second potential and simultaneously establishing said second potential at the others of said plurality of terminals, said matrix circuit comprising a unidirectional circuit including a first plurality of unidirectional devices each having one terminal coupled to a terminal of said plurality of quinary terminals and the other terminal connected to one of said binary terminals, another unidirectional circuit including a second plurality of unidirectional devices each having a terminal coupled to a terminal of said plurality of quinary terminals and the other terminal connected to the other one of said binary terminals, and means combining the outputs of said unidirectional circuits for operating an indicator circuit.

13. A matrix circuit for operation with binary and quinary circuits including a pair of binary terminals and means alternately establishing first and second potentials at a first of said pair of binary terminals and simultaneosuly establishing second and first potentials, respectively, at the second terminal of said pair of binary terminals, a plurality of quinary terminals and means for sequentially changing the potential at one of said plurality of quinary terminals from said first potential to said second potential and simultaneously establishing said second potential at the others of said plurality of quinary terminals, said matrix circuit comprising a unidirectional circuit including a first plurality of unidirectional devices each having one terminal connected to the same terminal of said binary terminals, each of the other terminals of said devices being resistively coupled to a terminal of said quinary terminals, another unidirectional circuit including a second plurality of unidirectional devices each having one terminal connected to the other terminal of said pair of binary terminals and the other terminals of said second plurality of devices being coupled to terminals of said plurality of quinary terminals, and means including further unidirectional devices for combining the outputs of said unidirectional circuits for operating an indicator circuit.

14. A matrix circuit for operation with binary and quinary circuits including a pair of binary terminals and means alternately establishing first and second potentials at a first of said pair of binary terminals and simultaneously establishing second and first potentials, respectively, at the second terminal of said pair of binary terminals, a plurality of quinary terminals and means for sequentially changing the potential at one of said plurality of quinary terminals from said first potential to said second potential and simultaneously establishing said second potential at the other of said plurality of quinary terminals, said matrix circuit comprising a first unidirectional circuit including six unidirectional devices having their cathodes conductively joined to one of said binary terminals, the anodes of three other unidirectional devices being resistively connected to a fourth terminal of said quinary terminals, a further unidirectional circuit including five unidirectional devices each having its cathode connected to the other terminal of said pair of binary terminals, the anodes of a pair of said further unidirectional devices being resistively connected to two different terminals of said quinary terminals, the anodes of a further pair of said unidirectional devices being resistively coupled and the anode of a fifth one of said unidirectional devices being unidirectionally coupled to one of said two different terminals and a third terminal of said quinary terminals, the anode of said fifth one of said unidirectional devices being also resistively connected to a fourth one of said quinary terminals, a sixth further unidirectional device having its anode connected to the other terminal of said pair of binary terminals and its cathode resistively connected to said fourth terminal of said quinary terminals, the anodes of five of said unidirectional devices each having a series connection of a diode and resistor connected thereto and the sixth of said unidirectional devices having a resistor connected thereto, further diodes, the anodes of five of said further unidirectional devices being connected to the respective junctions of said diodes and resistors through said further diodes, the cathode of said sixth further unidirectional device having a resistor connected thereto whereby the remote ends of said resistors are adaptable to provide potentials indicative of the states of stability of said binary and quinary circuits.

References Cited in the file of this patent

UNITED STATES PATENTS

| | | |
|---|---|---|
| 2,521,788 | Grosdoff | Sept. 12, 1950 |
| 2,843,320 | Chrisholm | July 15, 1958 |
| 2,851,220 | Kimes | Sept. 9, 1958 |

UNITED STATES PATENT OFFICE
CERTIFICATE OF CORRECTION

Patent No. 3,010,651

November 28, 1961

Roy A. Hempel

It is hereby certified that error appears in the above numbered patent requiring correction and that the said Letters Patent should read as corrected below.

Column 1, lines 30 and 31, and column 2, line 44, strike out "now abandoned,", each occurrence.

Signed and sealed this 24th day of July 1962.

(SEAL)
Attest:

ERNEST W. SWIDER
Attesting Officer

DAVID L. LADD
Commissioner of Patents